United States Patent
Kang

(10) Patent No.: US 10,070,253 B2
(45) Date of Patent: Sep. 4, 2018

(54) METHOD, APPARATUS, AND RECORDING MEDIUM FOR RADIO FINGERPRINT MAP CONSTRUCTION AND LOCATION TRACKING

(71) Applicant: SK Planet Co., Ltd., Seongnam-si, Gyeonggi-do (KR)

(72) Inventor: Kichon Kang, Seoul (KR)

(73) Assignee: SK PLANET CO., LTD., Seongnam-si (KR)

(*) Notice: Subject to any disclaimer, the term of this patent is extended or adjusted under 35 U.S.C. 154(b) by 0 days.

(21) Appl. No.: 15/226,916

(22) Filed: Aug. 3, 2016

(65) Prior Publication Data
US 2017/0188188 A1 Jun. 29, 2017

(30) Foreign Application Priority Data

Dec. 29, 2015 (KR) ........................ 10-2015-0188287
Dec. 29, 2015 (KR) ........................ 10-2015-0188292

(51) Int. Cl.
*H04W 24/00* (2009.01)
*H04W 4/021* (2018.01)
*H04W 4/04* (2009.01)
*H04L 29/12* (2006.01)
*H04B 17/318* (2015.01)
*H04L 12/26* (2006.01)
*H04W 4/029* (2018.01)
*H04B 17/27* (2015.01)

(52) U.S. Cl.
CPC ............ *H04W 4/021* (2013.01); *H04B 17/27* (2015.01); *H04B 17/318* (2015.01); *H04L 43/0852* (2013.01); *H04L 61/6022* (2013.01); *H04W 4/029* (2018.02); *H04W 4/04* (2013.01)

(58) Field of Classification Search
CPC ....... H04W 4/021; H04W 4/028; H04W 4/04; H04L 43/0852; H04L 61/6022; H04B 17/318
USPC .............................. 455/456.1–456.5; 370/338
See application file for complete search history.

(56) References Cited

U.S. PATENT DOCUMENTS

| | | | | |
|---|---|---|---|---|
| 2012/0072106 | A1* | 3/2012 | Han | G01C 21/206 701/410 |
| 2012/0142366 | A1* | 6/2012 | De Castro Riesco | G01S 5/0252 455/456.1 |
| 2013/0260790 | A1* | 10/2013 | Itzhaki | H04W 4/02 455/456.1 |
| 2014/0241245 | A1* | 8/2014 | Berberana | H04W 24/02 370/328 |

* cited by examiner

*Primary Examiner* — Marcos Batista
(74) *Attorney, Agent, or Firm* — Brinks Gilson & Lione

(57) ABSTRACT

A radio fingerprint device implements a radio fingerprint map construction and location tracking method. In this method, the radio fingerprint device receives, from a manager terminal device, radio environment information varying for a predetermined time at a specific referential position in a particular indoor area so as to create a radio fingerprint map. Then the radio fingerprint device extracts a periodic pattern from the received radio environment information, and stores, in the radio fingerprint map, the extracted periodic pattern as a radio fingerprint feature of the specific referential position.

11 Claims, 15 Drawing Sheets

FIG. 2
(a)
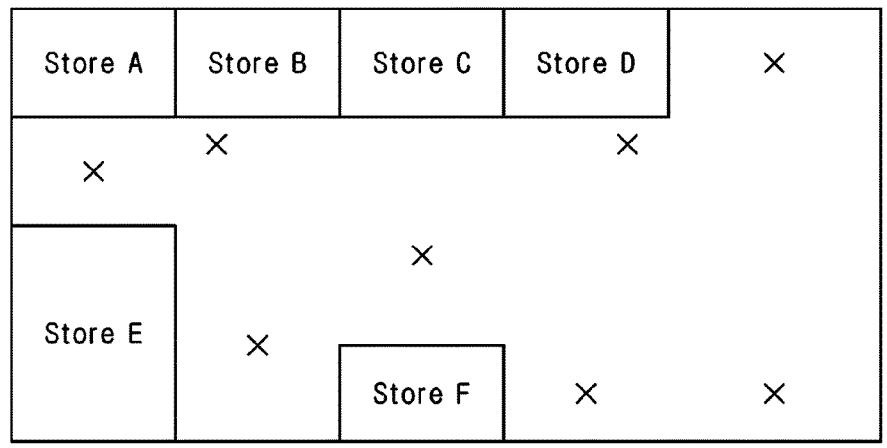
(b)
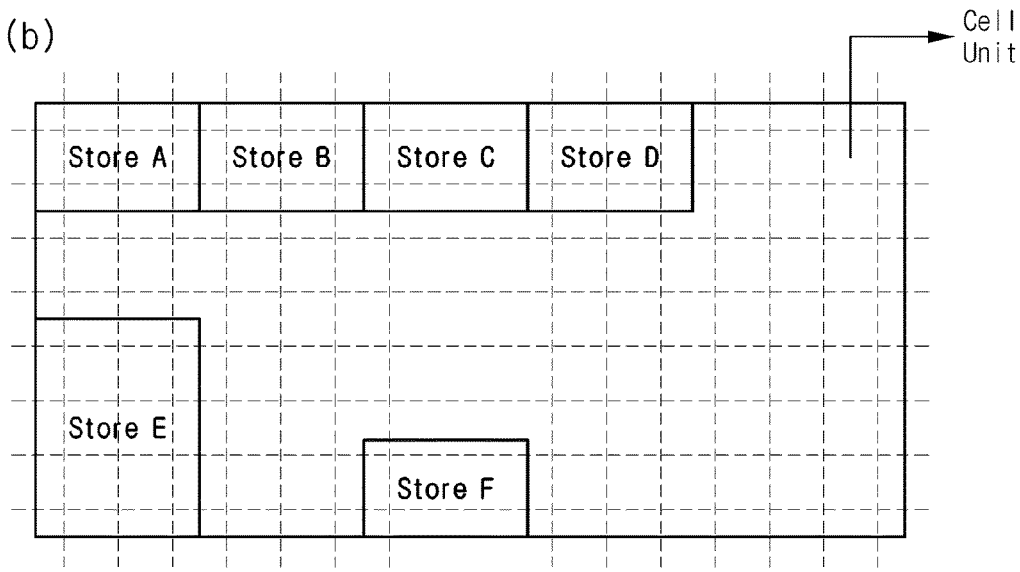

FIG. 4

| Beacon ID | Received per minute |
|---|---|
| AAA | 10 |
| BBB | 12 |
| CCC | 20 |
| DDD | 5 |
| EEE | 30 |

FIG. 5

Beacon ID : AAA, Received signal strength

| 5dB | 7dB | 4dB | 12dB | 6dB |
|-----|-----|-----|------|-----|
| 6dB | -3dB | 5dB | 4dB | 5dB |

FIG. 6

Beacon ID : AAA, Statistics of received signal strength

| Average | 5.25dB |
|---------|--------|
| Mode    | 5dB    |
| Max     | 7dB    |
| Min     | 4dB    |
| Median  | 5dB    |

FIG. 7

Fingerprint at first referential position

| Feature<br>Beacon ID | Received count | RSS | Freq channel | Emission location | ... |
|---|---|---|---|---|---|
| AAA | 10 | 5.25dB | 2.4GHz | (○○.○○) | ... |
| BBB | 12 | 6.15dB | 2.4GHz | (××.××) | ... |
| CCC | 20 | 4.5dB | 2.4GHz | (△△.△△) | ... |
| DDD | 5 | 2.21dB | 2.4GHz | (☆☆.☆☆) | ... |
| EEE | 30 | 3.12dB | 2.4GHz | (□□.□□) | ... |

US 10,070,253 B2

METHOD, APPARATUS, AND RECORDING MEDIUM FOR RADIO FINGERPRINT MAP CONSTRUCTION AND LOCATION TRACKING

CROSS REFERENCE TO RELATED APPLICATION

This application claims the priority of Korean Patent Application No. 10-2015-0188287 filed on Dec. 29, 2015 and of Korean Patent Application No. 10-2015-0188292 filed on Dec. 29, 2015 in the Korean Patent and Trademark Office. This application, in its entirety, is incorporated herein by reference.

TECHNICAL FIELD

The present invention relates to a method, apparatus, and recording medium for a radio fingerprint map construction and location tracking. More particularly, the present invention relates to extracting a periodical radio signal pattern at a specific position by measuring radio environment information for a certain time and also to constructing, based on the extracted pattern, a radio fingerprint map to be used for location tracking or positioning.

BACKGROUND

Details disclosed in this section merely offers background information regarding embodiments of the present invention. No determination has been made, and no assertion is made, as to whether any of the below might be applicable as prior art with regard to the present invention.

With the remarkable development of a mobile communication network and related technologies, today's mobile communication devices have outgrown a typical category of simple communication devices or information providing devices and are now evolving into total entertainment devices.

In addition, a smart phone that combines the function of a communication terminal with that of a PDA (Personal Digital Assistant) is popularized in these days. A smart phone is an intelligent device in which computer-based functions such as internet communication and information retrieval are added to a mobile phone. Compared with a typical communication terminal, a smart phone has a higher-capacity memory and a higher-performance CPU (Central Processing Unit) and also uses an OS (Operating System) for supporting the execution of various applications, voice/data communication, interworking with PC (Personal Computer), and the like.

As one type of application techniques using a smart phone, a variety of location-based services (e.g., an in-vehicle navigator, a map viewer, a path finding, an indoor store guide, etc.) for offering convenience to users is launched and attracts much interest.

The important thing in location-based services is how to accurately identify or determine the location of a user.

Normally, for location tracking, a location-based service uses the GPS (Global Positioning System). However, the GPS is not available in indoor environments due to a failure in communication with satellites. Therefore, network-based location tracking techniques, e.g., based on RFID, Bluetooth, or Wi-Fi, are often used for indoor environments.

Cell-ID, triangulation, and fingerprint are well-known examples of such tracking techniques. In particular, fingerprint technique is to randomly select some positions in a service area and to estimate the location of a tracking target by using RSS (Received Signal Strength) collected at the selected positions.

This technique has an advantage of reducing environmental factors of a channel by collecting necessary information in advance. This technique, however, requires many referential positions for location tracking. Further, such a collection process is manually carried out by a service manager, and this causes a burden of time and cost.

Additionally, signal strength frequently varies depending on indoor space arrangement. Therefore, if a spatial arrangement is changed, the fingerprint should be measured again thereabout. Further, various causes of errors make it difficult to measure an exact location.

SUMMARY

Accordingly, in order to address the aforesaid or any other issue, the present invention provides technique to construct a fingerprint map by collecting various types of radio environment information and adding time-based information thereto.

Specifically, this invention has objects of measuring radio environment information at referential positions for a certain time, extracting a particular variation pattern or cycle from the measure information, and constructing a radio fingerprint map based on such features associated with variations in radio environments.

Also, this invention has objects of analyzing features of radio environment information received from a user, comparing a variation pattern of the received radio environment information with radio environment patterns at respective referential positions in a radio fingerprint map, and identifying or determining the location of the user.

The present invention is not limited to the above objects, and any other object, even though not mentioned herein, may be well understood from the following description.

According to embodiments of the present invention, a radio fingerprint map construction and location tracking method is implemented by a radio fingerprint device. This method may comprises steps of receiving, from a manager terminal device, radio environment information varying for a predetermined time at a specific referential position in a particular indoor area so as to create a radio fingerprint map; extracting a periodic pattern from the received radio environment information; and storing, in the radio fingerprint map, the extracted periodic pattern as a radio fingerprint feature of the specific referential position.

According to embodiments of the present invention, the above method may further comprise steps of receiving the radio environment information from a user terminal device; and identifying a location of the user terminal device by comparing the received radio environment information with the periodic pattern stored in the radio fingerprint map.

According to embodiments of the present invention, a radio fingerprint device may comprise a communication module configured to receive, from a manager terminal device, radio environment information varying for a predetermined time at a specific referential position in a particular indoor area; a control module configured to extract a periodic pattern from the received radio environment information; and a memory module configured to store, in a radio fingerprint map, the extracted periodic pattern as a radio fingerprint feature of the specific referential position.

According to embodiments of the present invention, the communication module may be further configured to receive the radio environment information from a user terminal device, and the control module may be further configured to identify a location of the user terminal device by comparing the received radio environment information with the periodic pattern stored in the radio fingerprint map.

According to embodiments of the present invention, a computer-readable non-transitory storage medium that records thereon a program for executing the aforesaid radio fingerprint map construction and location tracking method may be provided.

According to this invention, a location tracking method can be provided with higher accuracy in view of variations in a radio environment depending on time.

Namely, by measuring various radio wave environments in addition to signal strength and further extracting a time-based variation pattern of a radio environment, this invention can obviate the above-discussed problem of typical location tracking technique and also reduce a possibility of errors in location tracking.

Other various advantages and effects will be disclosed explicitly or implicitly in embodiments of this invention to be described below in detail.

BRIEF DESCRIPTION OF THE DRAWINGS

FIG. 2 is an exemplary diagram illustrating an example of a radio fingerprint map construction and location tracking method according to an embodiment of the present invention.

FIGS. 3 to 7 are exemplary diagrams illustrating a radio fingerprint map construction method according to another embodiment of the present invention.

DETAILED DESCRIPTION

Figure 1:
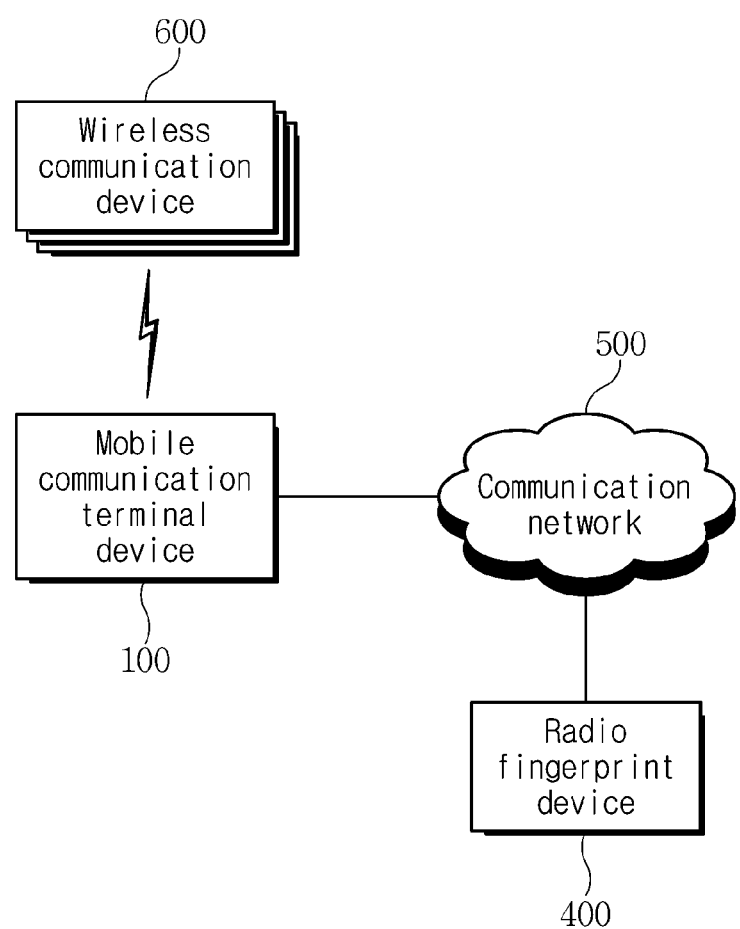
FIG. 1 is a block diagram illustrating a system for performing a radio fingerprint map construction and location tracking method according to an embodiment of the present invention.

Now, embodiments of the present invention will be described with reference to the accompanying drawings.

In the following description and the accompanying drawings, however, well known techniques may not be described or illustrated in detail to avoid obscuring the subject matter of the present invention. Through the drawings, the same or similar reference numerals denote corresponding features consistently.

The terms and words used in the following description and drawings are not limited to the bibliographical meanings and are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

The expression "1", "2", "first", or "second" used in various embodiments of this disclosure may modify various components of such embodiments but does not limit the corresponding components. The above expressions do not limit the sequence and/or importance of the components but may be used for distinguishing one component from other components. For example, a first device and a second device indicate different devices although both of them are devices. Meanwhile, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of this disclosure are only examples for describing a specific embodiment but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. The terms "include", "comprise", and "have" as well as derivatives thereof, mean inclusion without limitation.

Embodiments within the scope of the present invention include computer-readable media for carrying or having computer-executable instructions or data structures stored thereon. Such computer-readable media may be any available media, which is accessible by a general-purpose or special-purpose computer system.

By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links (of possibly different speeds) that enable the transport of electronic data between computer systems and/or modules (e.g., hardware and/or software modules). When information is transferred or provided over a network or another communications connection (either hardwired, wireless, or a combination of hardwired or wireless) to a computer system, the connection is properly viewed as a computer-readable medium.

Computer-executable instructions include, for example, instructions and data which cause a general-purpose computer system or special-purpose computer system to perform a certain function or group of functions. The computer executable instructions may be, for example, binaries, intermediate format instructions such as assembly language, or even source code.

Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like.

The invention may also be practiced in distributed computing environments where tasks are performed by remote processing devices that are linked through a communications network. In a distributed computing environment, program modules may be located in both local and remote memory storage devices.

Now, in various embodiments of the present invention, a radio fingerprint map construction and location tracking method, an apparatus for implementing the method, and a computer-readable storage medium recording a program for executing the method will be described with reference to the accompanying drawings.

At the outset, a radio fingerprint map construction and location tracking system will be described.

FIG. 1 is a block diagram illustrating a system for performing a radio fingerprint map construction and location tracking method according to an embodiment of the present invention.

As shown in FIG. 1, the radio fingerprint map construction and location tracking system may include a plurality of mobile communication terminal devices 100, a radio fingerprint device 400, a wireless communication device 600, and a network 500.

This system may be installed in a certain place having a specific range, for example, the entire area or some floors of a department store or a discount market. Also, this system may be installed in a local region containing a number of buildings. Considering the characteristics of a radio fingerprint, it is desirable to install this system in an indoor place.

In this disclosure, a user refers to a person who is offered a customer-target service (e.g., navigation based on indoor tracking, mobile payment, a discount coupon, an advertisement, etc.) from the radio fingerprint device 400 or the wireless communication device 600. Also, a manager refers to a person who manages the radio fingerprint device 400 or the wireless communication device 600.

The mobile communication terminal device 100 is a user's or manager's device capable of accessing a wireless communication network and transmitting or receiving various kinds of data.

The mobile communication terminal device 100 may be also referred to as UE (User Equipment), MS (Mobile Station), MSS (Mobile Subscriber Station), SS (Subscriber Station), AMS (Advanced Mobile Station), WT (Wireless Terminal), MTC (Machine Type Communication) device, M2M (Machine-to-Machine) device, D2D (Device-to-Device) device, STA (Station), or the like. This is, however, exemplary only and not to be considered as a limitation. Any device electrically or functionally connected or connectible to a wireless communication network of this invention may be considered as the mobile communication terminal device 100. The mobile communication terminal device 100 may perform a voice or data communication via the wireless communication network and may include a browser for sending or receiving information, a memory for storing programs and protocols, a microprocessor for executing and controlling various programs, and the like.

The mobile communication terminal device 100 may be realized in various forms. For example, a mobile device such as a smart phone, a tablet PC, a PDA (Personal Digital Assistant), a PMP (Portable Multimedia Player), an MP3 player, and the like may be used as the mobile communication terminal device 100.

Particularly, the mobile communication terminal device 100 may be capable of Bluetooth communication (e.g., Bluetooth 4.0, namely, BLE (Bluetooth Low Energy)) and/or Wi-Fi connection. Therefore, the mobile communication terminal device 100 may receive a signal from a device for emitting a beacon signal through BLE communication or from a beacon or AP (Access Point) device based on Wi-Fi and then perform a predetermined processing function. Besides, the mobile communication terminal device 100 may perform bidirectional communication with a beacon or AP device to which any short range communication technique, based on PAN (Personal Area Network), such as Zigbee, UWB (Ultra WideBand), ANT, Wi-Fi, NFC, or the like is applied.

The mobile communication terminal device 100 may be a user terminal device. In this case, the user terminal device 100 may access an application provider (not shown) connected to the network 500, receive a service application from the application provider, and install the received application. Then the user terminal device 100 may execute such a service application, extract identification information from a signal of the wireless communication device 600, and transmit the extracted information to the radio fingerprint device 400. Also, the user terminal device 100 may receive, from the radio fingerprint device 400, specific content (e.g., a beacon service corresponding to a store residence time, etc.) mapped to the identification information and offer the received content to a user.

The mobile communication terminal device 100 that uses various application services based on a location tracking service offered by the radio fingerprint device 400 is referred to as the above user terminal device. On the other hand, the mobile communication terminal device 100 that constructs a radio fingerprint map within a particular range and offers various related services is referred to as a manger terminal device.

The user terminal device and the manager terminal device have similar structures. However, the manager terminal device may further have a management module for creating a radio fingerprint map and transmit or receive information associated with the creation of the map to or from the radio fingerprint device 400.

Detailed elements of the mobile communication terminal device 100 will be described below.

The radio fingerprint device 400, a sort of server, is an element for providing a service to a user via the network. The radio fingerprint device 400 may receive a requested service packet from the terminal device 100 and then transmit a response packet to the terminal device 100.

The radio fingerprint device 400 may be a WAS (Web Application Server), an IIS (Internet Information Server), or a well-known web or cache server using Apache Tomcat or Nginx. Additionally, one or devices that constitute a network computing environment may be used as the radio fingerprint device 400.

Also, the radio fingerprint device 400 may support an OS (Operating System) such as Linux or Windows and execute received control commands. In view of software, the radio fingerprint device 400 may have a program module formed by means of computer languages such as C, C++, Java, Visual Basic, Visual C, and the like.

Particularly, the radio fingerprint device 400 may set a referential position for measuring a radio wave so as to create a radio fingerprint map, set a time point for measuring a radio wave at the referential position, and transmit to the manager terminal device such setting information to be used for measuring radio environment information.

The radio environment information refers to information that indicates features with regard to all radio waves extractable from a specific position, including MAC (Media Access Control) address, signal strength information (e.g., RSSI (Received Signal Strength Intensity/Indication)), propagation time information (e.g., RTT (Round Trip Time)), identification information (e.g., SSID, BSSID, etc.) of the wireless communication device 600, and the like.

MAC address is a sort of address allocated to the wireless communication device 600 for communication. MAC address exists in all types of devices or equipment, such as an LAN card, a modem, a smart phone, etc., used in the network. MAC address is a serial number expressed as a 12-digit hexadecimal number and is specific to each device or equipment. MAC address may vary depending on a change of parts through, for example, MAC spoofing.

MAC address consists of 48 bits in total. The front 24 bits contain an identification code of an OUI (Organizational Unique Identifier) manufacturer and information about an NIC (Network Interface Controller) manufacturer, and the other 24 bits contain information about a LAN card.

MAC address may be used for Ethernet, 802.11 wireless network, Bluetooth, IEEE 802.5 token ring, IEEE 802 network, FDDI (Fiber Distributed Data Interface), ATM (Asynchronous Transfer Mode), fiber channel, serial attached SCSI (Small Computer System Interface), ITU-T (International Telecommunication Union's Telecommunication standardization sector) G.hn standard, and the like. Meanwhile, in other communication schemes such as Firewire, IPv6, Zigbee, 802.15.4, or 6LoWPAN, a EUI-64 identifier may be used instead of MAC address.

Signal strength information is obtained by measuring the strength of a signal received from the wireless communication device 600 at the mobile communication terminal device 100. This signal strength information may be associated with a signal loss and a signal travel distance between the mobile communication terminal device 100 and the wireless communication device 600. Signal strength may be unstable depending on an environment of the mobile communication terminal device 100.

Specifically, signal strength is greatly influenced by an antenna directivity of the wireless communication device 600, an obstacle such as a wall, a pillar, furniture, a person, etc. residing between a transmitting side and a receiving side, a material of an indoor component, and the like.

Propagation time information indicates a propagation time of a signal between two devices and is used for computing a distance between such devices. For example, propagation time information is used to measure ToA (Time-of-Arrival) by using technique similar with the principle of TWR (Two Way Ranging) defined in IEEE802.15.4a.

As one of well-known techniques for measuring a propagation time, TOF (Time of Flight) technique is to synchronize both devices in time, to measure a travel time of a signal between both devices, and to compute a distance therebetween. As another technique, TDOF (Time Difference of Flight) technique is to use a time difference of signals delivered between mobile communication terminal device 100 and two or more wireless communication devices 600 so as to compute a distance.

If the wireless communication device 600 is a beacon device, e.g., a BLE beacon, identification information of the wireless communication device 600 may be a unique value of the BLE beacon including UUID (Universally Unique Identifier), Major/Minor Version, and signal strength.

This BLE beacon identification information consists of 16-byte UUID, 2-byte Major, and 2-byte Minor. UUID, an identifier standard used for construction of software, is standardized as a part of DCE (Distributed Computing Environment) by OSF (Open Software Foundation) and is a unique identifier expressed as a 32-digit hexadecimal number.

In case of Wi-Fi beacon, identification information is a unique value of each Wi-Fi, including BSSID, frequency, and signal strength. BSSID (Basic Service Set Identifier) refers to a 48-bit identifier or network ID for identifying a basic service set in WLAN (Wireless Local Area Network) standard, 802.11. This means in general a MAC address of AP equipment. In case of independent BSS or Ad-hoc network, BSSID is created as arbitrary value.

Such identification information may be the basis for the user terminal device 100 or the radio fingerprint device 400 to identifying the wireless communication device 400 and the location thereof.

In case the wireless communication device 600 is a wireless AP device, identification information of the AP device may be an IP (Internet Protocol) address.

Detailed elements of the radio fingerprint device 400 will be described below.

Additionally, the radio fingerprint device 400 may be connected to the mobile communication terminal device 100 via the communication network 500. The communication network 500 refers to any type of network, such as Internet, Intranet, a mobile communication network, a satellite communication network, etc., capable of transmitting and receiving data through IP by using various wired/wireless communication techniques.

Also, the communication network 500 may store computing resources such as hardware and software by combining with the radio fingerprint device 400 or the mobile communication device 100. The communication network 500 may refer to a closed-type network such as LAN (Local Area Network) or WAN (Wide Area Network), an open-type network such as Internet, a network such as CDMA (Code Division Multiple Access), WCDMA (Wideband CDMA), GSM (Global System for Mobile communications), LTE (Long Term Evolution), or EPC (Evolved Packet Core), a next-generation network to be developed, and a computing network.

In addition, the communication network 500 includes a plurality of access networks (not shown) and a core network (not shown), and may further include an external network, e.g., Internet (not shown).

Here, the access network is to perform wired/wireless communication with the mobile communication terminal device 100 and may be formed of a plurality of base stations, also referred to as BTS (Base Transceiver Station), NodeB, or eNB (eNodeB or evolved Node B), and controllers such as BSC (Base Station Controller) and RNC (Radio Network Controller).

Additionally, instead of such a base station that includes a digital signal processor and a radio signal processor, a plurality of radio units (not shown) corresponding to the radio signal processor may be disposed respectively at a plurality of regions and connected to a centralized digital unit (not shown) corresponding to the digital signal processor.

The core network which forms a mobile network together with the access network performs a function to connect the access network and the external network such as Internet.

The core network is a network system that performs main functions for a mobile communication service such as mobility control and switching between the access networks. Namely, the core network performs circuit switching or packet switching and further manages and controls a packet flow in the mobile network.

In addition, the core network may manage mobility between frequencies, control traffic therein and in the access network, and control interworking with other network such as Internet. The core network may be formed of SGW (Serving GateWay), PGW (PDN GateWay), MSC (Mobile Switching Center), HLR (Home Location Register), MME (Mobile Mobility Entity), HSS (Home Subscriber Server), and/or the like.

The Internet is a world common network through which information is exchanged according to TCP/IP protocol. The Internet may deliver information, offered from the radio fingerprint device 400, to the mobile communication terminal device 100 through the core network and the access network. Similarly, the Internet may deliver information, offered from the mobile communication terminal device 100, to the radio fingerprint device 400 through the core network and the access network.

The wireless communication device 600 is located at an indoor place where a certain service based on a radio fingerprint map is provided. The wireless communication device 600 performs a function to emit a radio signal to one or more wireless communication terminal devices 100. Further, the wireless communication device 600 may broadcast, to the mobile communication terminal devices 100, a radio signal that contains identification information (i.e., unique ID).

A radio signal broadcasted by the wireless communication device 600 may be a signal periodically emitted by a beacon device or a signal designed to send or receive at a wireless AP device.

The wireless communication device 600 may be one of a router, a repeater, a switch, and a bridge, and may be any device capable of a short range communication such as UWB (Ultra Wide Band), RFID (Radio Frequency IDentification), IrDA (Infrared Data Association), Zigbee, and Bluetooth.

Meanwhile, a processor embedded in each device according embodiments of this invention may process a program command for executing the method of this invention. This processor may be a single-threaded processor or a multi-threaded processor. Also, this processor may process commands stored in a memory or any other storage.

Described heretofore is the entire system for performing a radio fingerprint map construction and location tracking method according to an embodiment of the present invention.

Hereafter, each device for performing the radio fingerprint map construction and location tracking method according to an embodiment of the present invention will be described.

FIG. 2 is an exemplary diagram illustrating an example of a radio fingerprint map construction and location tracking method according to an embodiment of the present invention.

FIG. 2 shows a particular indoor area crowded with a plurality of stores. In case this particular indoor area is a shopping mall, one or more of the wireless communication device 600 capable of broadcasting a radio signal containing a unique ID may exist. For example, there are wireless AP devices for providing wireless internet itself or various services based thereon to users in the shopping mall or beacon devices for providing a beacon service to such users.

In case there are two or more of the wireless communication device 600, a radio emission cycle or pattern of the wireless communication device 600 may vary depending on various causes such as a control of a server, a communication protocol of the wireless communication device 600, and the like.

Namely, two or more wireless communication devices 600 may have different radio emission cycles. For example, if there are three beacon devices, these devices may have different cycles, 1 second, 2 seconds, and 3 seconds, respectively. Even though having the same cycles, the wireless communication devices 600 may have different radio emission time points. For example, even though two beacon devices have the same radio emission cycle 3 seconds, one device may emit beacon signals at 10:05:01 and at 10:05:04 whereas the other may emit beacon signals at 10:05:02 and at 10:05:05.

In addition, depending on the arrangement of such wireless communication devices 600 and the geographical configuration inside a store, radio environment information may be measured differently even at the same position. In this situation, the radio fingerprint device 400 determines a referential position required for the measurement of radio environment information. The letter 'X' in section (a) of FIG. 2 denotes such a referential position.

When referential positions are determined as shown in section (a) of FIG. 2, the manager terminal device collects radio environment information from such positions and transmits the collected information to the radio fingerprint device 400. According to an embodiment, the manager terminal device may collect radio environment information for an enough time to extract a radio signal pattern at a specific referential position.

The radio fingerprint device 400 receives radio environment information from the manager terminal device, calculates or extracts a periodic pattern of a referential position from the received information, and stores the extracted periodic pattern as a radio fingerprint feature of the referential position. If radio fingerprint features are collected from a sufficient number of referential positions, the collected features may be used with higher accuracy for indoor location tracking. The periodic patterns extracted from respective referential positions may be different from each other according to referential positions, and stored individually in a radio fingerprint map.

In order to determine a referential position to be used for extracting and storing radio fingerprint features, an indoor area may be divided into small cell units as shown in section (b) of FIG. 2. In this case, the manager terminal device collects radio environment information from each cell unit. Then, using this information, the radio fingerprint device 400 extracts a periodic pattern of a radio signal with regard to each cell unit and stores it in a radio fingerprint map.

Further, the manager terminal device may transmit, to the radio fingerprint device 400, information about a currently facing direction of the manager terminal device together with radio environment information by using a geomagnetic sensor or the like embedded therein. By employing this direction of measuring a radio wave, it is possible to further consider a variation of a radio environment depending on a reception direction or due to a manager, a user, or any other obstacle. This may acquire more reliable radio fingerprint map and also enhance the accuracy of location tracking.

Since collected data reflects space features as discussed above, this technique has higher accuracy than triangulation technique. Further, if a radio network environment is favorable, and if referential positions or cell units are densely arranged, the location of the mobile communication terminal device 100 may be tracked or identified with higher accuracy.

The radio fingerprint map constructed regarding a particular indoor space as discussed above may be used in tracking or identifying a user's location.

While a user is located in a store, the user terminal device may collect radio environment information and direction information at that location and send the collected information to the radio fingerprint device 400. Then the radio fingerprint device 400 compares the received information with radio fingerprint features of respective referential positions in the stored radio fingerprint map. As a result, the radio fingerprint device 400 determines that the user terminal device is located at a referential position having the highest similarity.

Meanwhile, since the radio fingerprint map according to an embodiment of this invention records, as a radio fingerprint feature, a periodic pattern of radio environment information at each referential position during a certain time span, a time cycle of receiving radio environment information from the user terminal device may be different from a time cycle of a periodic pattern recorded in the radio fingerprint map.

If the time cycle of receiving radio environment information from the user terminal device is shorter than the time cycle of the periodic pattern recorded in the radio fingerprint map, the radio fingerprint device 400 determines whether the received radio environment information has similarity with a part of the recorded periodic pattern.

Otherwise, if the time cycle of receiving radio environment information from the user terminal device is longer than the time cycle of the periodic pattern recorded in the radio fingerprint map, the radio fingerprint device 400 may determine whether the recorded periodic pattern appears in a part of the received radio environment information. Alternatively, in this case, the radio fingerprint device 400 may extract a periodic pattern from the received radio environment information and then find a referential position having the highest similarity with the recorded periodic pattern.

Described heretofore with reference to FIG. 2 is an example of constructing the radio fingerprint map and tracking the user location.

FIGS. 3 to 7 are exemplary diagrams illustrating a radio fingerprint map construction method according to another embodiment of the present invention.

Figure 3:
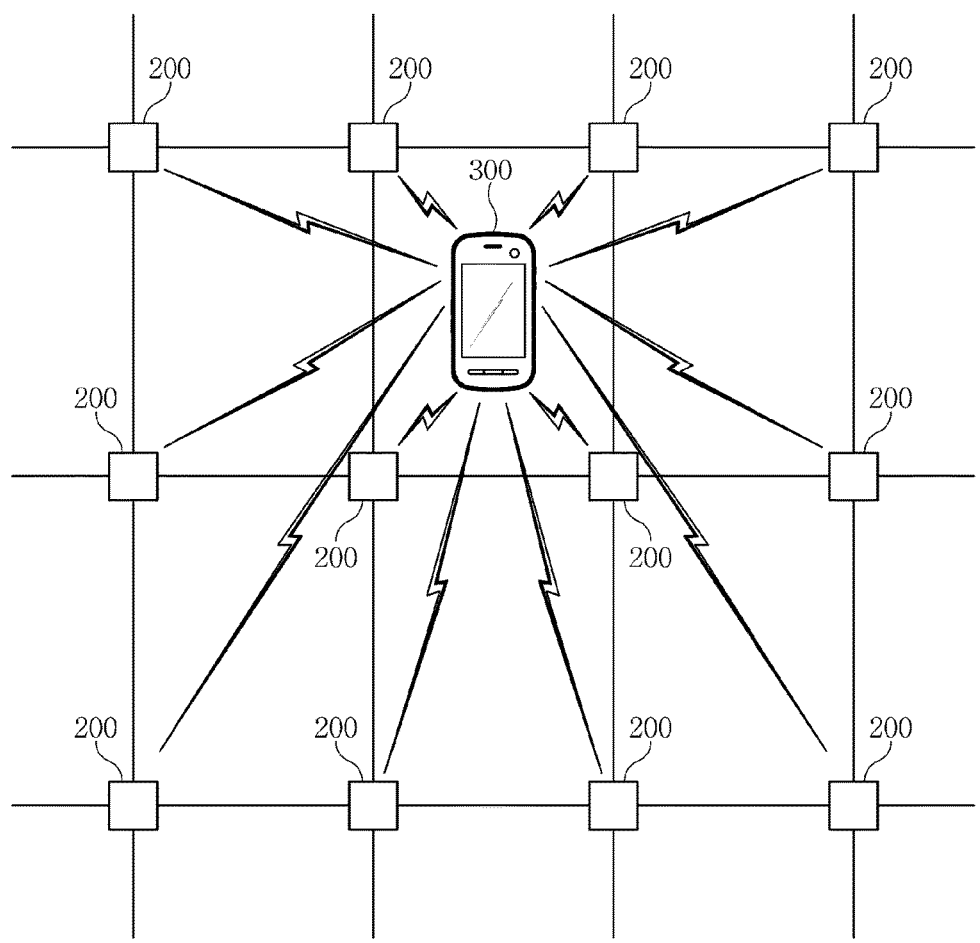

Referring to FIG. 3, the user terminal device 100 receives radio signals from at least one wireless communication device 600 at a specific referential position.

Thereafter, the user terminal 100 transmits, to the radio fingerprint device 400, received signal strength information, identification information, and/or frequency channel information together with location information of the user terminal device 100.

At this time, the user terminal device 100 may calculate the number of receiving identification information of each wireless communication device 600 for a given time, and then transmit the calculated reception number to the radio fingerprint device 400.

Alternatively, this reception number may be computed by the radio fingerprint device 400. This alternative embodiment will be described hereinafter through FIGS. 4 to 7.

In case the radio fingerprint device 400 calculates the reception number, the user terminal device 100 needs not calculate the reception number. However, if necessary, both the user terminal device 100 and the radio fingerprint device 400 may calculate the reception number.

FIG. 4 shows an example in which the user terminal device 100 receives radio signals from five wireless communication devices 600 having IDs 'AAA', 'BBB', 'CCC', 'DDD' and 'EEE', respectively. Whenever a radio signal is received, the user terminal device 100 extracts identification information from the received signal and sends it to the radio fingerprint device 400. Then, by counting the identification information received from the user terminal device 100 for a particular time, the radio fingerprint device 400 can output the number of radio signals received by the user terminal device 100 for that particular time.

Shown in FIG. 4 is the number of receiving identification information from the user terminal device 100 for one minute, namely the number of receiving radio signals from each wireless communication device 600 at the user terminal device 100 for one minute. For example, the number of receiving radio signals from the wireless communication device 600 having ID 'AAA' is 10. Similarly, the numbers of receiving radio signals from the wireless communication devices 600 having IDs 'BBB', 'CCC', 'DDD', and 'EEE' are 12, 20, 5, and 30, respectively.

FIG. 5 shows information about received signal strength of ten radio signals received from the wireless communication device 600 having ID 'AAA' for one minute and also shows a process of filtering the received signal strength information. Since the number of receiving radio signals from the wireless communication device 600 having ID 'AAA' is 10 as shown in FIG. 4, the received signal strength information has also ten pieces.

As exemplarily shown in FIG. 5, ten pieces of the received signal strength information are 5 dB, 7 dB, 4 dB, 12 dB, 6 dB, 6 dB, −3 dB, 5 dB, 4 dB, and 5 dB. Among them, 12 dB and −3 dB having a considerable difference from the others are filtered. At this time, filtering is carried out on the basis of a predetermined threshold, e.g., 4 dB. Namely, 12 dB and −3 dB having a difference more than 4 dB from the others in signal strength are filtered.

As the result of filtering, the number of receiving radio signals from the wireless communication device 600 having ID 'AAA' may be revised 10 to 8.

FIG. 6 shows an example of statistics about signal strength information after filtering 12 dB and −3 dB.

As shown, statistics of the signal strength information may include at least one of an average value, a mode value (i.e., the most frequently occurring value), a maximum value, a minimum value, and a median value. For constructing the radio fingerprint map, all or part of the above statistical values may be used.

In FIG. 6, statistics of the signal strength information about radio signals received from the wireless communication device 600 having ID 'AAA' for one minute are outputted as an average value of 5.25 dB, a mode value of 5 dB, a maximum value of 7 dB, a minimum value of 4 dB, and a median value of 5 dB.

After calculating the reception number information and statistics of signal strength information for one minute with regard to each wireless communication device 600, the radio fingerprint device 400 identifies an emission location of each wireless communication device 600. At this time, frequency channel information and identification information received from the user terminal device 100 and also wireless communication device database stored in the radio fingerprint device 400 are used together with the above-calculated information and statistics. Then, by mapping the identified emission location and the like to the location of the user terminal device 100 (e.g., the first referential position in case of FIG. 7), the radio fingerprint map is constructed as shown in FIG. 7, for example.

Described heretofore is a method for constructing the radio fingerprint map according to another embodiment of the present invention.

Now, the mobile communication terminal device 100 that performs a radio fingerprint map construction and location tracking will be described in detail with reference to FIGS. 8 to 10.

Figure 8:
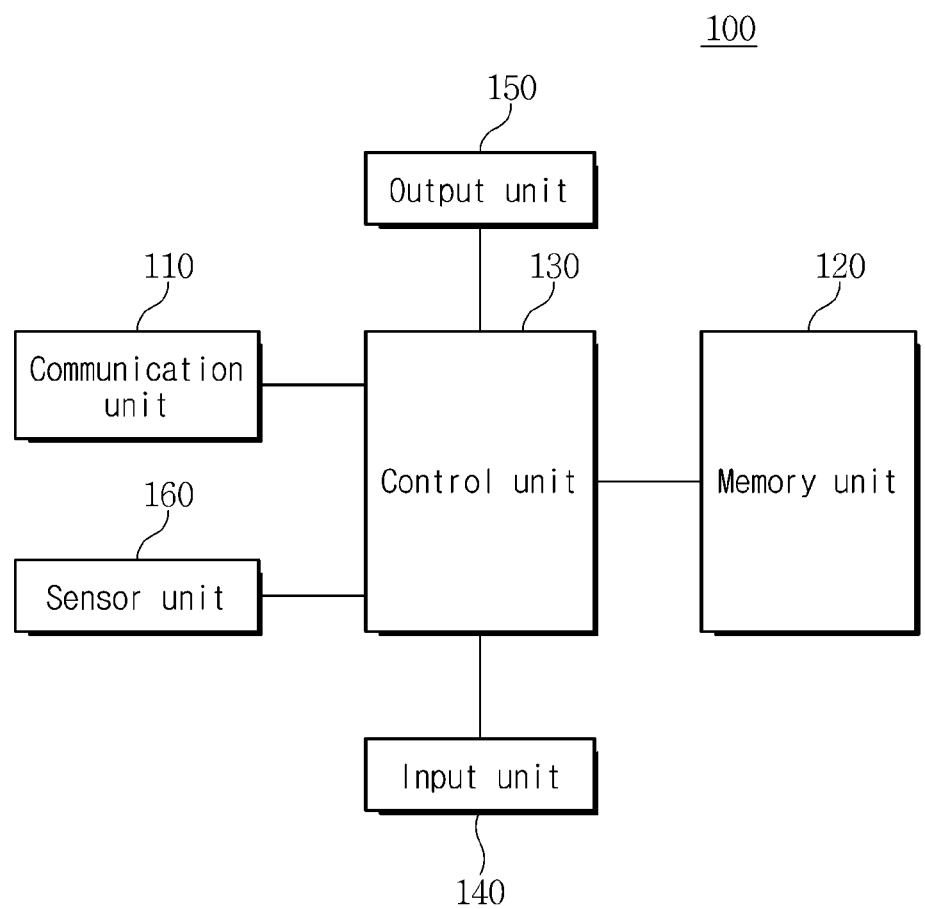
FIG. 8 is a block diagram illustrating a mobile communication terminal device for performing a fingerprint map construction and location tracking method according to an embodiment of the present invention.

FIG. 8 is a block diagram illustrating a mobile communication terminal device for performing a fingerprint map construction and location tracking method according to an embodiment of the present invention.

Referring to FIG. 8, the mobile communication terminal device 100 may include a communication unit 110, a memory unit 120, a control unit 130, an input unit 140, an output unit 150, and a sensor unit 160.

As mentioned above, each of the user terminal device and the manager terminal device is a sort of the mobile communication terminal device 100 having similar structures.

The manager terminal device may include a module or application configured to perform transmission and reception of information required for or associated with the construction of a radio fingerprint map. In response to a manager's manipulation or command, the manager terminal device may operate an application for a radio fingerprint map construction, display a referential position, and transmit radio environment information and direction information to the radio fingerprint device 400.

The user terminal device may have an application configured to perform a location-based service. In response to a manager's manipulation or command, the user terminal device may operate an application for offering a location-based service, transmit radio environment information and direction information, collected during operations, to the radio fingerprint device 400, and output the result of location tracking through the application.

The communication unit 110 is configured to transmit or receive data to or from an external source. For example, the communication unit 110 may be formed of a logical combination of one or more software and/or hardware modules, such as a network interface card and a corresponding NDIS (Network Driver Interface Specification) stack.

The communication unit 110 may support various communication protocols. For example, various kinds of mobile communication standards such as AMPS, CDMA, GSM, WCDMA, HSDPA, LTE and LTE-A are supportable and also short range communication techniques such as BLE and Zigbee are supportable.

Particularly, the communication unit 110 may transmit and receive data to and from the radio fingerprint device 400 through the network 500 and also may include a mobile communication module configured to perform access to the communication network 500 and data transmission/reception in compliance with mobile communication standards. Such data transmitted or received may include radio environment information and direction information collected by the mobile communication terminal device 100. In case of the user terminal device, location information offered from the radio fingerprint device 400 and various service contents based on the location information may be further included.

The memory unit 120 may be configured to store data or program to be executed or processed by the control unit 130. Basically, the memory unit 120 may store an OS (Operating System) for booting of the mobile communication terminal device 100 and operating the above-mentioned respective elements. Further, the memory unit 120 may store applications or programs for supporting various user functions, for example, a call function, a music player function, an image viewer function, a video playback function, and the like.

Particularly, the memory unit 120 may store a specific application or program required for or associated with a radio fingerprint map construction and location tracking method according to this invention.

The specific application or program is to construct a radio fingerprint map in case of the manager terminal device and to be offered a location-based service using the constructed fingerprint map in case of the user terminal device.

The memory unit 120 may include magnetic media (such as a hard disk, a floppy disk, and a magnetic tape), optical medium (such as CD-ROM (Compact Disk Read Only Memory) and DVD (Digital Video Disk)), magneto-optical media (such as a floptical disk), ROM, RAM (Random Access Memory), and/or a flash memory.

The control unit 130 is configured to perform the whole control of the mobile communication terminal device 100 and may include one or more processors. This processor may be a single-threaded processor or a multi-threaded processor.

Through such one or more processors, the control unit 130 may perform or process a command stored in the memory unit 120. This command may include an analyzable command such as a script command (e.g., JavaScript or ECMAScript) or any other command recorded in an executable code or computer-readable medium.

Particularly, the control unit 130 may control the communication unit 110 to transmit or receive information to or from the radio fingerprint device 400 by using an application stored in the memory unit 120. Namely, the control unit 130 operates in compliance with service logic of an application or program stored in the memory unit 120 and thereby performs the radio fingerprint map construction and location tracking method.

The control unit 130 of the manager terminal device receives information about a referential position for collecting radio environment information from the radio fingerprint device 400 through the communication unit 110 and then displays the received information through the output unit 150. Additionally, the control unit 130 may collect radio environment information at the referential position for a certain time in response to a manager's manipulation or command, measure direction information associated with the measurement of radio environment information, calculate the number of receiving radio signals, and transmit results of measurement and calculation to the radio fingerprint device 400.

The control unit 130 of the user terminal device may set to use a service offered by a manager of the radio fingerprint device 400 in response to a user's manipulation or command. Therefore, the control unit 130 may measure radio environment information and direction information and also transmit collected information to the radio fingerprint information 400. Also, the control unit 130 may receive a service or content offered by the radio fingerprint device 400 on the basis of information transmitted by the user terminal device, and then display the received service or content through the output unit 150.

The input unit 140 is configured to receive a user's input. Namely, the input unit 140 creates an input signal in response to a user's manipulation and then delivers the created input signal to the control unit 130.

The input unit 140 may be formed of various well-known input mechanisms, e.g., a keyboard, a mouse, a joystick, a jog wheel, a touch screen, a touch pad, and the like. Also, the input unit 140 may further include a gesture input mechanism, a voice recognition mechanism, a motion detection mechanism, an eye tracking mechanism, a proximity sensor mechanism, and the like.

The input unit 140 may be connected to the control unit 130 through a system bus and an input/output interface.

The input/output interface may be at least one of various feasible interfaces such as a serial port interface, a PS/2 interface, a parallel port interface, a USB interface, an IEEE (Institute of Electrical and Electronics Engineers) 1394 interface (i.e., a FireWire interface), and the like, or any combination thereof.

The output unit 150 is configured to offer an operating result or status of the mobile communication terminal device 100 to a user. Particularly, the output unit 150 may visually output information through a display mechanism.

For example, the output unit 150 may be formed of various kinds of a 2-dimensional display such as ELD (Electro Luminescent Display), VFD (Vacuum Fluorescent Display), LCD (Liquid Crystal Display), TFT-LCD (Thin Film Transistor LCD), LED (Light Emitting Diode), OLED (Organic LED), and AMOLED (Active Matrix OLED), or a 3-dimensional display such as holography and a laser beam.

The output device 150 may be connected to the control unit 130 through a video interface such as HDMI (High Definition Multimedia Interface) or GDI (Graphics Device Interface). The control unit 130 and the video interface may be connected to each other via a system bus.

Particularly, the output unit 150 may be used to display information received from the radio fingerprint device 400.

The sensor unit 160 is configured to detect a user's motion and thereby compute a moving distance and direction. The sensor unit 160 may include a GPS module, a geomagnetic sensor, a tilt sensor, an acceleration sensor, a gyro sensor, a grip sensor, a proximity sensor, a biometric sensor, an illuminance sensor, and the like.

Particularly, the sensor unit 160 may detect the current direction of the mobile communication terminal device 100.

Figure 9:
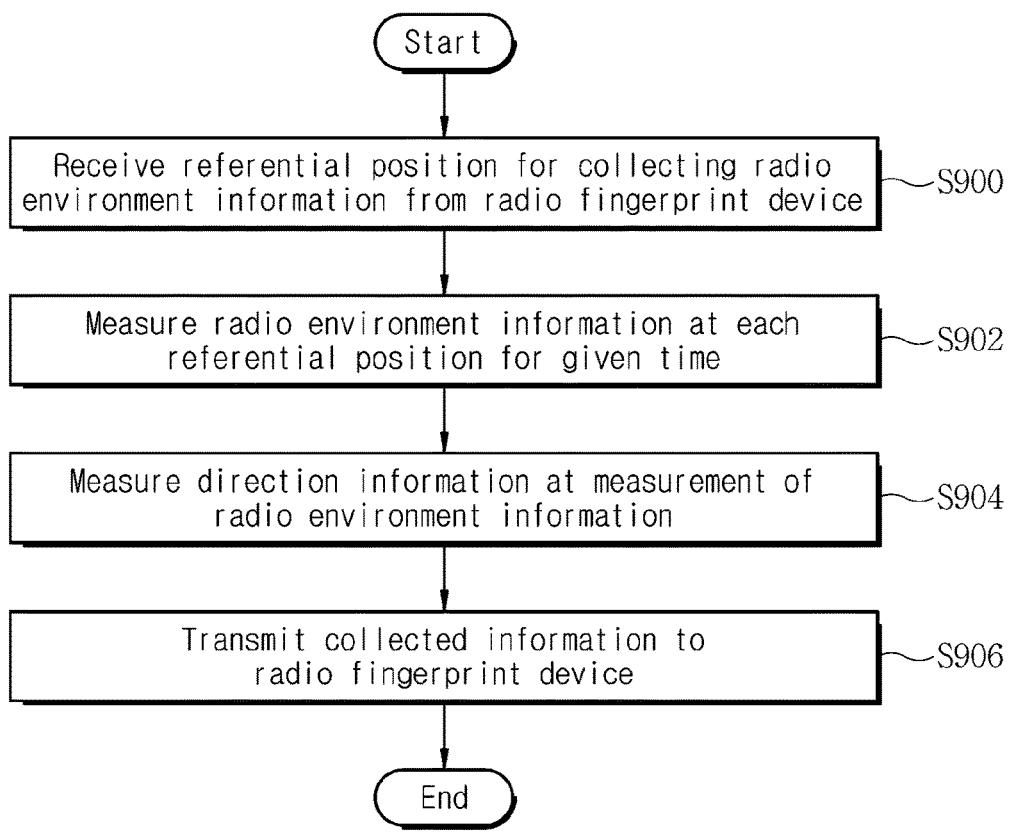
FIGS. 9 and 10 are flow diagrams illustrating operations of a manager terminal device for performing a radio fingerprint map construction and location tracking method according to an embodiment of the present invention.

FIG. 9 is a flow diagram illustrating operations of a manager terminal device for performing a radio fingerprint map construction and location tracking method according to an embodiment of the present invention.

Referring to FIG. 9, the manager terminal device receives a referential position for collecting radio environment information from the radio fingerprint device 400 (step S900). Then the manager terminal device measures radio environment information at the received referential position (step S902), and also measures direction information thereof (step S904). Thereafter, the manager terminal device transmits the measured information to the radio fingerprint device 400 (step S906). All or parts of these steps may be performed by the control unit 130 discussed above.

Figure 10:
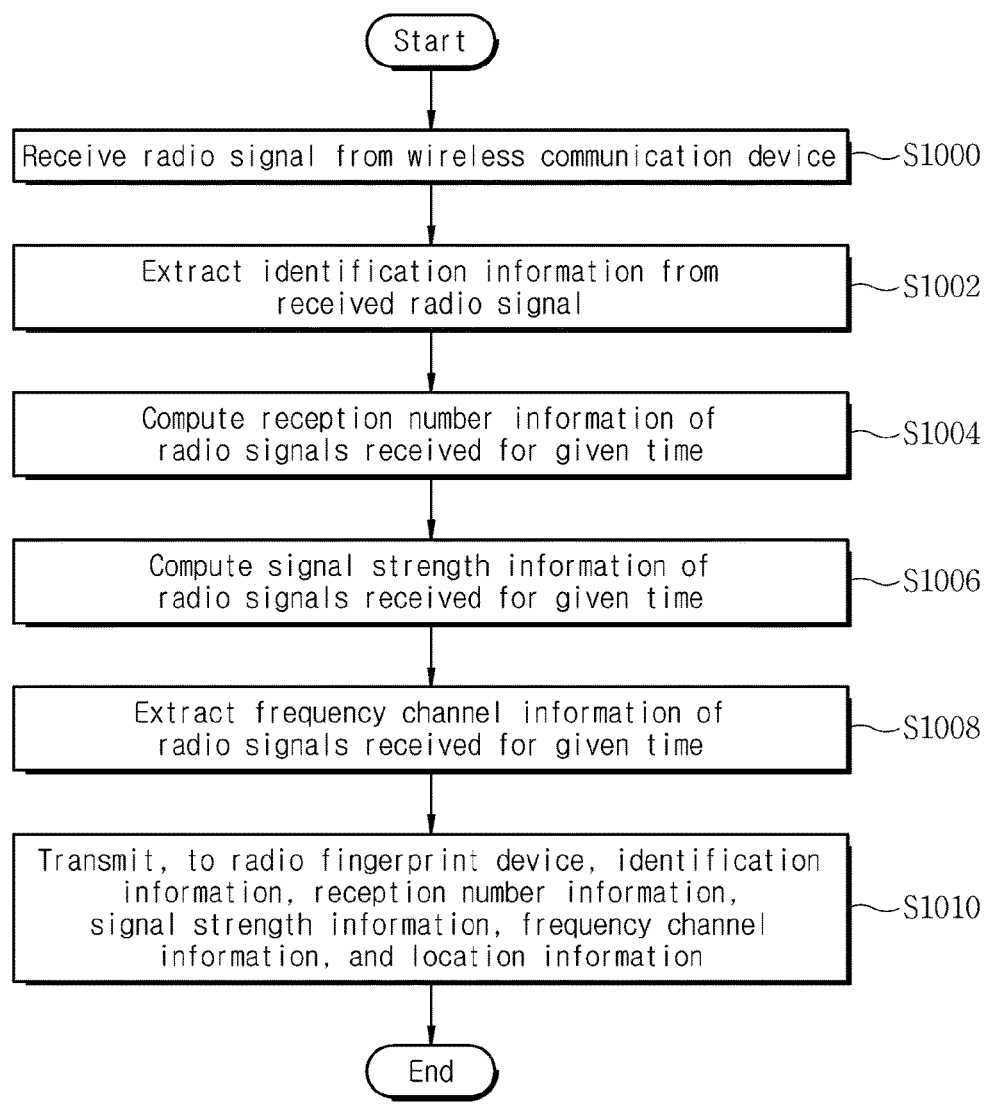

FIG. 10 is a flow diagram illustrating operations of a manager terminal device for performing a radio fingerprint map construction and location tracking method according to another embodiment of the present invention.

Referring to FIG. 10, the manager terminal device receives a radio signal emitted periodically by at least one wireless communication device 600 located around the manager terminal device (step S1000). Then the manager terminal device extracts, from the received radio signal, identification information corresponding to each wireless communication device 600 (step S1002).

Additionally, the manager terminal device computes reception number information, namely, information about the number of receiving such radio signals from each wireless communication device 600 for a specific time (step S1004). For example, the manager terminal device calculates how many times radio signals are received from the wireless communication device 600 having ID 'AAA' for one minute, and also calculates how many times radio signals are received from the wireless communication device 600 having ID 'BBB' for one minute.

Further, the manager terminal device computes signal strength information, namely, information about signal strength of radio signals received for a specific time (step S1006). For example, the manager terminal device calculates signal strength of radio signals received from the wireless communication device 600 having ID 'AAA' for one minute.

Also, the manager terminal device extracts frequency channel information about radio signals received from each wireless communication 600 for a specific time (step S1008). At this step, the frequency channel information may include frequency band information and channel hopping pattern information used by each wireless communication device 600 that emits radio signals.

Thereafter, the manager terminal device transmits, to the radio fingerprint device 400, the extracted identification information, the computed reception number information, the computed signal strength information, and the extracted frequency channel information, together with location information thereof (step S1010).

Meanwhile, step of computing the number of receiving radio signals from each wireless communication device 600 at the manager terminal device for a specific time may be performed by the radio fingerprint device 400. In this case, the above-discussed step S1004 step may be omitted.

Namely, if the manger terminal device extracts identification information from a radio signal whenever receiving the radio signal and then transmits the extracted information to the radio fingerprint device 400, and if the radio fingerprint device 400 calculates the reception number information, the manager terminal device needs not compute the reception number information at step S1004.

Also, in this case, the manager terminal device transmits all kinds of information except the reception number information to the radio fingerprint device 400 at step S1010.

Figure 11:
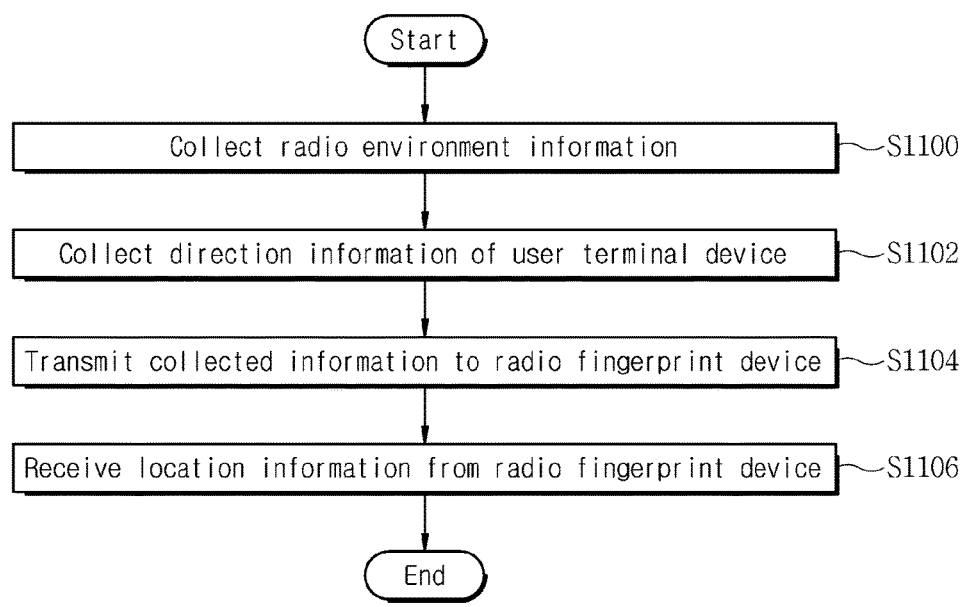
FIG. 11 is a flow diagram illustrating operations of a user terminal device for performing a radio fingerprint map construction and location tracking method according to an embodiment of the present invention

FIG. 11 is a flow diagram illustrating operations of a user terminal device for performing a radio fingerprint map construction and location tracking method according to an embodiment of the present invention Referring to FIG. 11, if it is set to use a service offered by the radio fingerprint device 400 in response to a user's manipulation or command, the user terminal device collects radio environment information at the current location thereof (step S1100), and simultaneously collects direction information thereof (step S1102).

Then the user terminal device transmits the collected information to the radio fingerprint device 400 (step S1104). Thereafter, the user terminal device may receive location information from the radio fingerprint device 400 or receive a particular service or content based on such location information (step S1106). This process may be performed while the user terminal device is moving.

Described heretofore is the mobile communication terminal device 100 according to an embodiment of this invention.

Now, the radio fingerprint device 400 for performing the radio fingerprint map construction and location tracking method will be described in detail.

Figure 12:
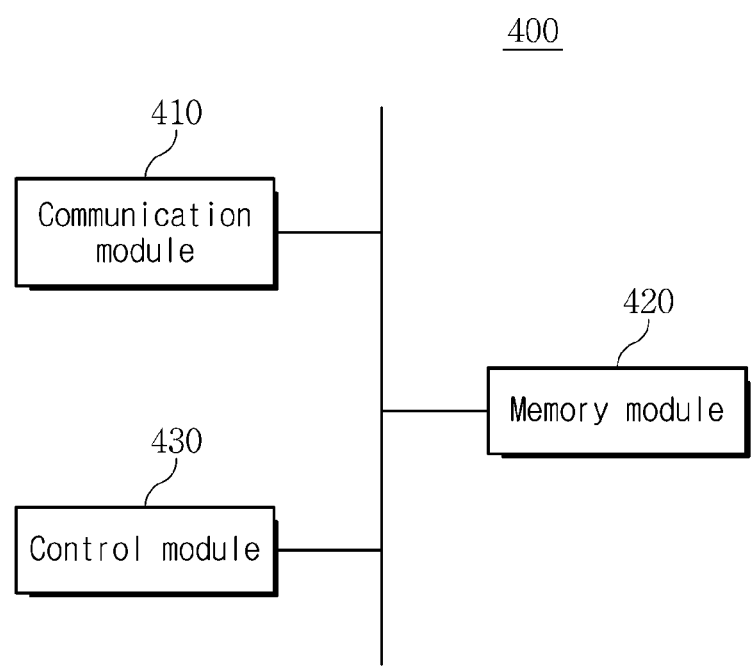
FIG. 12 is a block diagram illustrating a radio fingerprint device for performing a radio fingerprint map construction and location tracking method according to an embodiment of the present invention.

FIG. 12 is a block diagram illustrating a radio fingerprint device for performing a radio fingerprint map construction and location tracking method according to an embodiment of the present invention.

Referring to FIG. 12, the radio fingerprint device 400 may include a communication module 410, a memory module 420, and a control module 430.

The communication module 410 is configured to transmit or receive data to or from an external source. For example, the communication module 410 performs communication by being connected with the mobile communication terminal device 100 through the network 500. For example, the communication module 410 may support transmission and reception of information with the user terminal device 100 such as receiving radio environment information and direction information from the user terminal device 100, transmit an identified location to the user terminal device, and, if a manager offers a location-based service, transmit related contents to the user terminal device.

The memory module 420 may store a program for performing the radio fingerprint map construction and location tracking method according to an embodiment of this invention. Also, the memory module 420 stores radio environment information and direction information received from the mobile communication terminal device 100.

Additionally, the memory module 420 may store a radio fingerprint map which records a periodic pattern of each referential position extracted from radio environment information.

Further, the memory module 420 may store a mapping relation between identification information and location information of each wireless communication device 600 in the form of database.

When receiving certain identification information from the mobile communication device 100, the radio fingerprint device 400 may identify the location of the wireless communication device 600 corresponding to the received identification information by using the stored mapping relation.

The control module 430 is configured to control the radio fingerprint device 400 to perform the radio fingerprint map construction and location tracking method and may include or be supported by one or more processors. This processor may be a single-threaded processor or a multi-threaded processor.

Through such one or more processors, the control module 430 may perform or process a command stored in the memory module 420. This command may include an analyzable command such as a script command (e.g., JavaScript or ECMAScript) or any other command recorded in an executable code or computer-readable medium.

Particularly, the control module 430 according to an embodiment of this invention may extract a periodic pattern from radio environment information for each referential position received from the manager terminal device in a particular indoor area for construction of a radio fingerprint map. Then, based on such a periodic pattern, the control module 430 may construct a radio fingerprint map in which a periodic pattern of radio environment information for each referential position is stored as radio fingerprint features.

The referential position may be defined by dividing a particular indoor area in the unit of cells. In this case, collecting radio environment information, extracting a pattern, and storing radio fingerprint features may be performed in the cell unit.

Also, the radio fingerprint map may further contain direction information at a measurement time when the manager terminal device measures radio environment information for each referential position.

The control module 430 may use the constructed radio fingerprint map for location tracking of the user terminal device. When there is any user terminal device that uses a location tracking service, the communication module 410 may receive radio environment information and direction information from the user terminal device. Then the control module 430 may compare the received information with radio fingerprint features for each referential position stored in the constructed radio fingerprint map, regard a particular referential position having the most similar periodic pattern as the current location of the user terminal device, thereby create location information about the user terminal device, and transmit the created location information to the user terminal device.

If a time cycle of receiving radio environment information from the user terminal device is shorter than that of the periodic pattern recorded in the radio fingerprint map, the control module 430 determines whether the received radio environment information has similarity with a part of the recorded periodic pattern.

Otherwise, if a time cycle of receiving radio environment information from the user terminal device is longer than that of the periodic pattern recorded in the radio fingerprint map, the control module 430 determines whether the recorded periodic pattern appears in a part of the received radio environment information. Alternatively, in this case, the control module 430 may extract a periodic pattern from the received radio environment information and then find a referential position having the highest similarity with the recorded periodic pattern.

Figure 13:
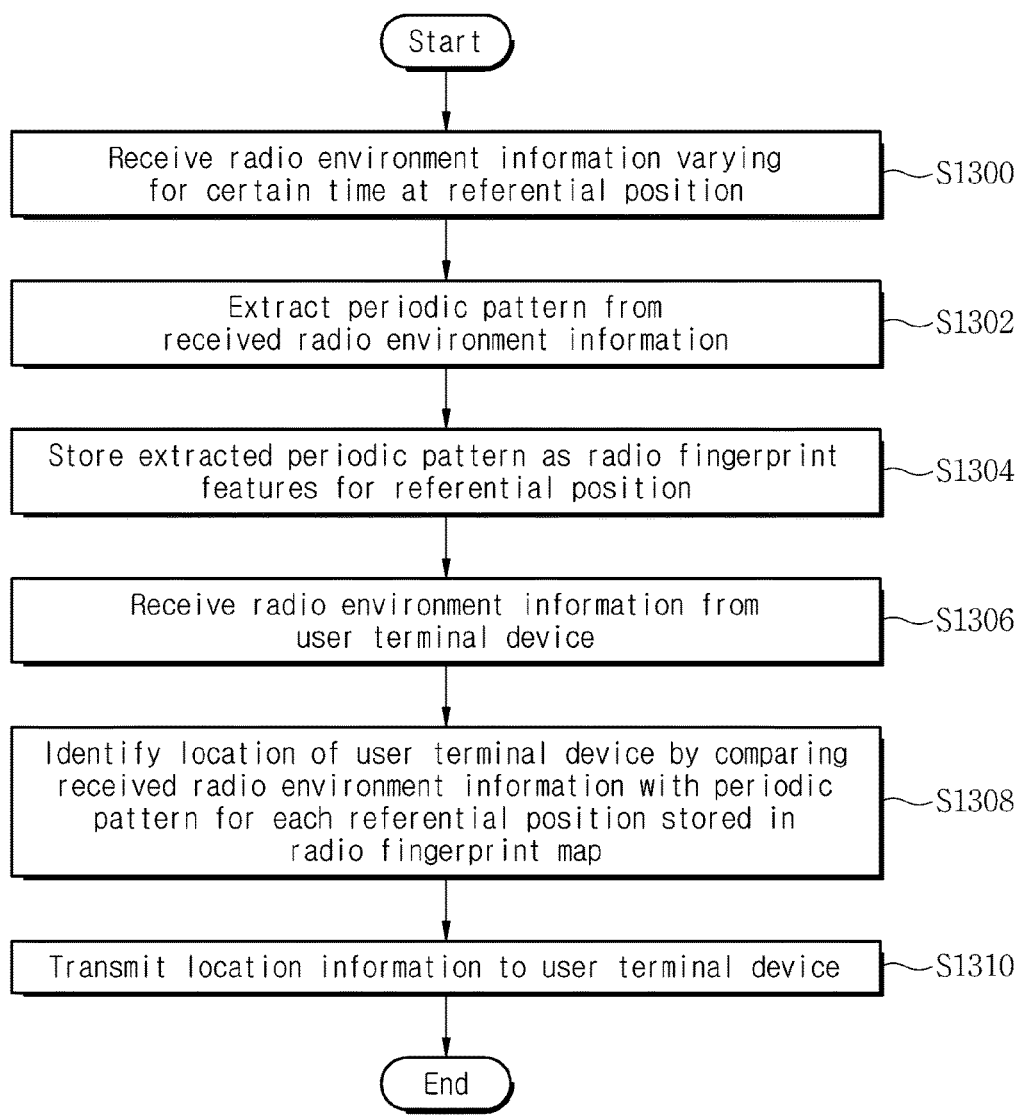
FIGS. 13 and 14 are flow diagrams illustrating operations of a radio fingerprint device for performing a radio fingerprint map construction and location tracking method according to an embodiment of the present invention.

FIG. 13 is a flow diagram illustrating operations of the radio fingerprint device 400 according to an embodiment of the present invention.

Referring to FIG. 13, at the outset, for creation of a radio fingerprint map, the radio fingerprint device 400 receives, from the manager terminal device, radio environment information varying for a certain time at a specific referential position in a particular indoor area (step S1300).

Then the radio fingerprint device 400 extracts a periodic pattern from the received radio environment information (step S1302) and stores, in a radio fingerprint map, the extracted periodic pattern as radio fingerprint features for the specific referential position (step S1304).

At these steps, the radio fingerprint device 400 may also receive direction information obtained together when the radio environment information is measured.

If such referential positions are densely arranged, the fingerprint map may be constructed with higher accuracy.

When the radio fingerprint map is constructed, the radio fingerprint device 400 may offer a location tracking service. Therefore, the radio fingerprint device 400 receives radio environment information from the user terminal device (step S1306).

Then the radio fingerprint device 400 identifies the location of the user terminal device by comparing the received radio environment information with a periodic pattern for each referential position stored in the radio fingerprint map (step S1308), thereby creates location information, and transmits the created location information to the user terminal device (step S1310).

Figure 14:
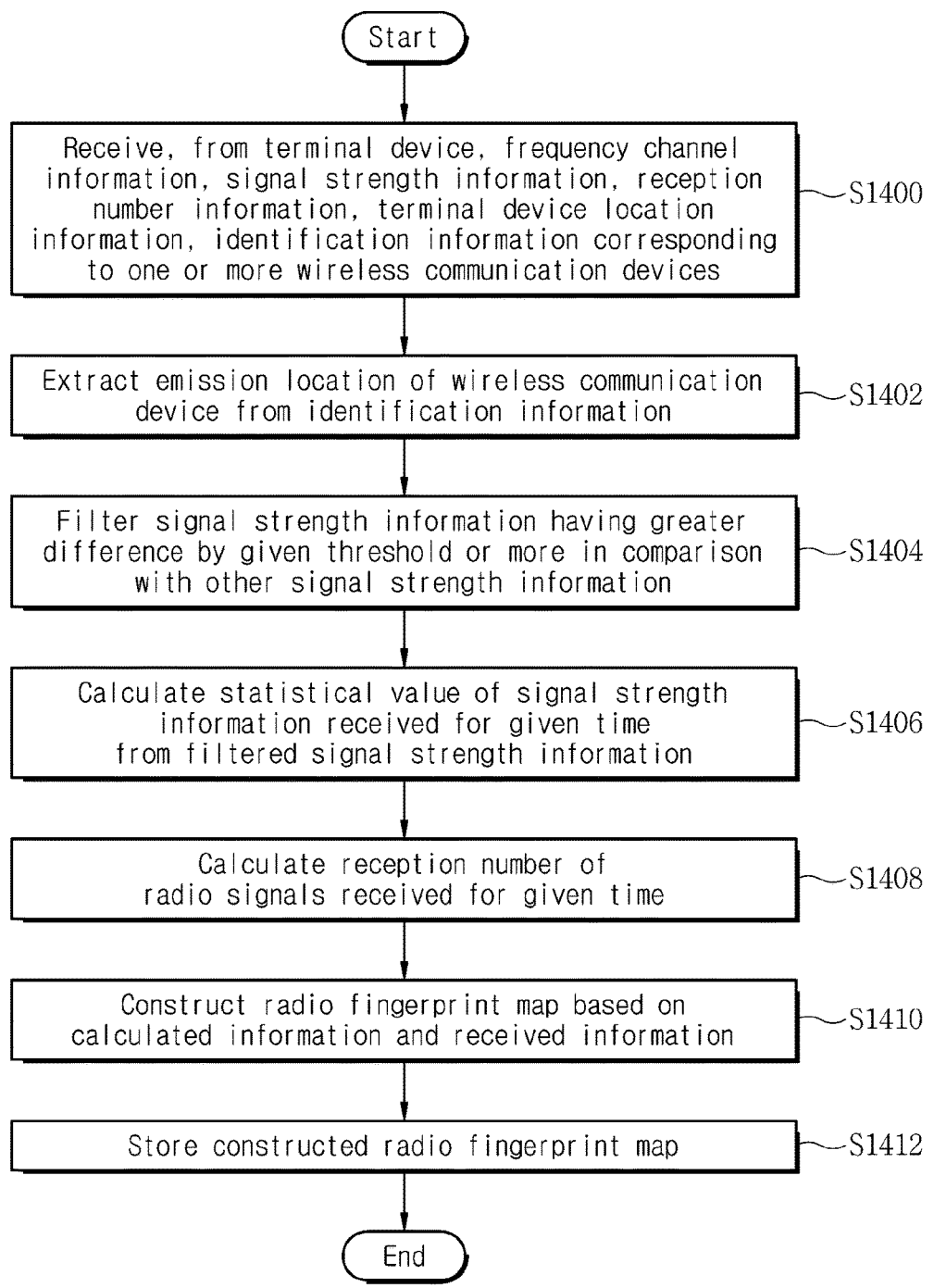

FIG. 14 is a flow diagram illustrating operations of the radio fingerprint device 400 according to another embodiment of the present invention.

Referring to FIG. 14, the radio fingerprint device 400 receives, from the manager terminal device, frequency channel information and beacon identification information corresponding to each wireless communication device 600, received signal strength information of the manager terminal device, and location information indicating a location where the manager terminal device receives beacon signals (step S1400).

Additionally, the radio fingerprint device 400 extracts, from the received identification information, an emission location of the wireless communication device 600, i.e., a location where the wireless communication device 600 is installed (step S1402).

At this step, the emission location of the wireless communication device 600 may be extracted on the basis of information stored as database in the memory module 420.

Then, among the received signal strength for the respective wireless communication devices 600, the radio fingerprint device 400 filters signal strength information having a greater difference by a given threshold or more in comparison with the other signal strength information (step S1404).

Namely, if a given threshold is 5dB, signal strength information having a difference of 5dB or more in comparison with the other signal strength information is filtered.

This is to exclude abnormal data, such as erroneous data or data having a considerable difference from the other data, from calculation of a statistical value associated with signal strength, thereby constructing a more reliable radio fingerprint map.

From the filtered signal strength information, the radio fingerprint device 400 calculates a statistical value of signal strength information received for a given time with regard to each wireless communication device 600 (step S1406).

At this time, such a statistical value may include at least one of an average value, a mode value (i.e., the most frequently occurring value), a maximum value, a minimum value, and a median value.

Namely, all or part of the calculated statistical values may be used for constructing a radio fingerprint map.

Then the radio fingerprint device 400 calculates the number of receiving identification information for each wireless communication device 600 from the manager terminal device for a given time (step S1408).

For example, the number of receiving specific beacon identification information 'AAA' from the manager terminal device for one minute is calculated.

Meanwhile, at step S1400, the radio fingerprint device 400 may also receive, from the manager terminal device, reception number information, together with other information, indicating the number of receiving radio signals corresponding to the respective wireless communication devices 600. In this case, the above-discussed step S1408 may be skipped.

In other words, if step S1004 shown in FIG. 10 is performed, step S1408 shown in FIG. 14 may be skipped. On the contrary, if step S1004 shown in FIG. 10 is skipped, step S1408 shown in FIG. 14 should be performed.

Of course, if necessary, step S1004 of FIG. 10 and step S1408 of FIG. 14 may be performed together.

If the number of receiving identification information for each wireless communication device 600 for a given time is calculated at step S1408, the radio fingerprint device 400 constructs a radio fingerprint map by mapping the calculated reception number, the signal strength information or signal strength statistics, the received identification information, and the received frequency information to the received location information of the manager terminal device (step S1410) and then store the constructed radio fingerprint map in the memory module 420 (step S1412).

The above-discussed operations of the radio fingerprint device 400 may be controlled and performed by the control module 430 of the radio fingerprint device 400.

Heretofore, the operation of the radio fingerprint device 400 according to an embodiment of this invention is described through a flow diagram.

This invention includes a program for performing the above-discussed radio fingerprint map construction and location tracking method. This program may be recorded in a storage medium and also may perform the aforesaid functions by being installed, read and executed in and by a computer.

These programs may include codes in programming languages such as C, C++, JAVA and machine codes readable by a computer processor or CPU so that the computer reads the programs recorded in recording media to conduct the foregoing functionalities.

Namely, the codes may include, but not limited to, computer languages such as data-oriented languages (e.g., SQL, dBase), system languages (e.g., C, Objective C, C++, Assembly), architectural languages (e.g., Java, NET), and application languages (e.g., PHP, Ruby, Perl, Python), or any other language well known in the art.

The codes may include functional codes related to functions defining the aforementioned functionalities and control codes related to an execution procedure needed for the computer processor to execute the functionalities according to a preset procedure.

Further, the codes may further include memory reference related codes regarding additional information needed for the computer processor to perform the functionalities or a location or address of an internal or external memory that media refer to.

In addition, when the computer processor needs communications with a remote computer or server to perform the functionalities, the codes may further include communication related codes regarding how the computer processor communicates with which remote computer or server using a wire-based and/or wireless communication module and what kind of information or media the computer processor transmits or receives in communications.

The computer-readable storage medium suitable for storing computer program commands and data may include magnetic media such as a hard disk, a floppy disk and a magnetic tape, optical media such as CD-ROM (Compact Disk Read Only Memory) and DVD (Digital Video Disk), magneto-optical media such as a floptical disk, and semiconductor memories such as ROM (Read Only Memory), RAM (Random Access Memory), flash memory, EPROM (Erasable Programmable ROM) and EEPROM (Electrically EPROM). A processor and memory may be supplemented by a special-purpose logic circuit or integrated therewith.

Further, the computer-readable recording media including the programs may be distributed to a computer system connected via a network, and accordingly computer-readable codes may be stored and implemented in distributed mode.

Functional programs, relevant codes and code segments to implement the present invention may be readily inferred or modified by programmer skilled in the art in view of a system configuration of the computer that reads the recording media to execute the programs.

Respective steps in embodiments of this invention may be implemented in computer-executable commands and executed by a computing system. This computing system is defined as one or more software modules, one or more hardware module, or combinations thereof, that work together to perform operations on electronic data.

For example, the definition of computer system includes the hardware components of a personal computer, as well as software modules, such as the operating system of the personal computer. The physical layout of the modules is not important. A computer system may include one or more computers coupled via a network.

Likewise, a computer system may include a single physical device where internal modules, such as a memory and processor, work together to perform operations on electronic data.

Implementations may be implemented in a computing system that includes a back-end component, e.g., a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network.

Namely, a device or apparatus for performing the radio fingerprint map construction and location tracking method according to this invention may be implemented to perform the above-discussed embodiments based on a computing system to be described hereinafter.

Figure 15:
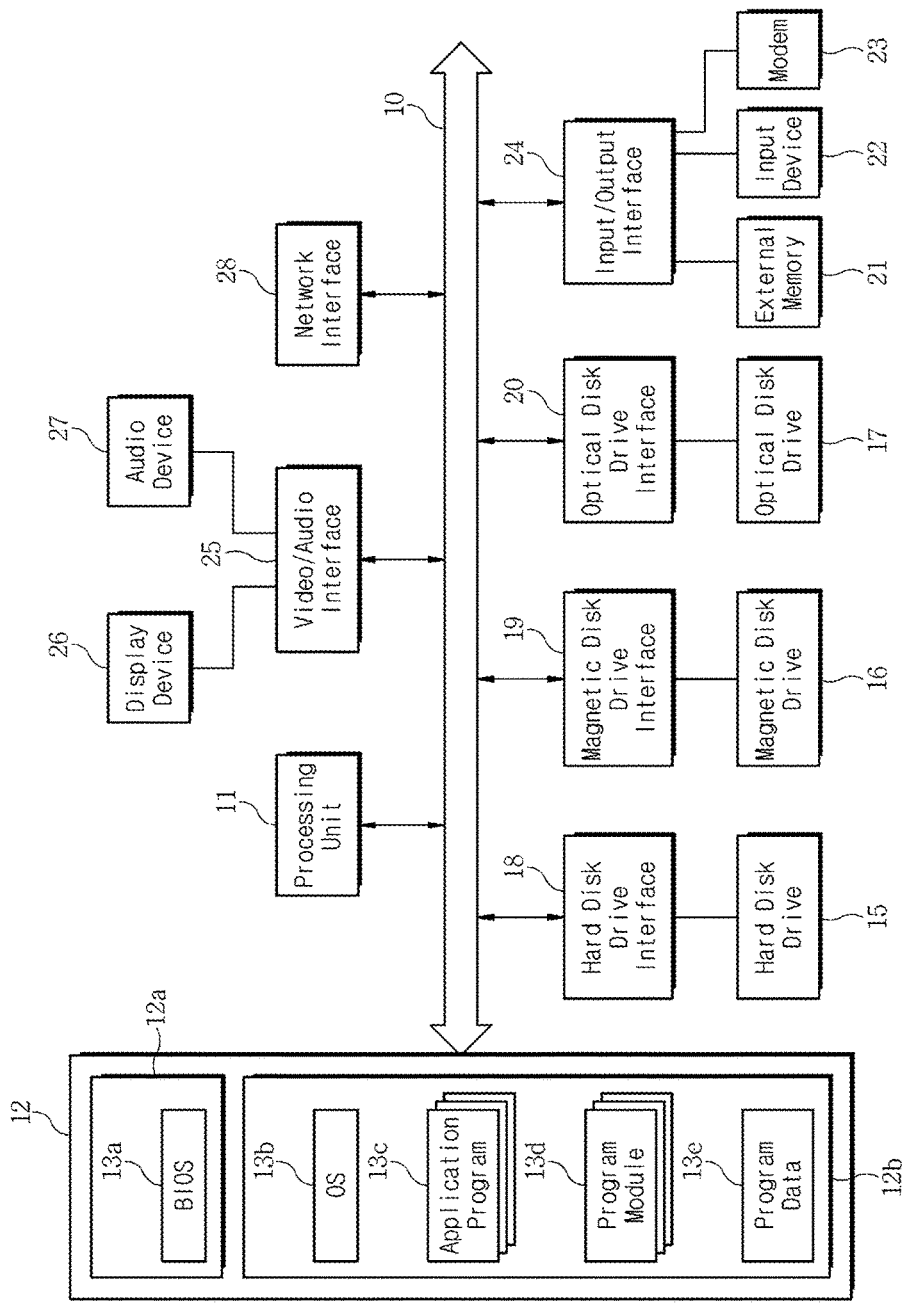
FIG. 15 is a block diagram illustrating an operating environment of an apparatus for offering a fingerprint map construction and location tracking method according to an embodiment of the present invention.

FIG. 15 is a block diagram illustrating an operating environment of an apparatus, i.e., the mobile communication terminal device 100 or the radio fingerprint device 400, for offering a fingerprint map construction and location tracking method according to an embodiment of the present invention.

FIG. 15 and the following discussion are intended to provide a brief, general description of an example suitable computing environment in which the invention may be implemented. Although not required (e.g., when implemented in hardware), the invention will be described in the general context of computer-executable instructions, such as program modules, being executed by computer systems.

Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

Referring to FIG. 15, an exemplary computing system for implementing the invention includes a processing unit 11, a system memory 12, and a system bus 10 that couples various system components including the system memory 12 to the processing unit 11.

The processing unit 11 can execute computer-executable instructions designed to implement features of this invention.

The system bus 10 may be any of several, types of bus structures including a memory bus or memory controller, a peripheral bus, and a local bus using any of a variety of bus architectures. The system memory 12 includes read only memory (ROM) 12a and random access memory (RAM) 12b.

A basic input/output system (BIOS) 13a, containing the basic routines that help transfer information between elements within computer system, such as during start-up, may be stored in the ROM 12a.

The computing system may also include a storage unit, e.g., a hard disk drive 15 for reading from and writing to a hard disk, a magnetic disk drive 16 for reading from or writing to a magnetic disk, and an optical disk drive 17 for reading from or writing to an optical disk such as a CD-ROM or other optical media.

The hard disk drive 15, the magnetic disk drive 16, and the optical disk drive 17 are connected to the system bus 10 by a hard disk drive interface 18, a magnetic disk drive-interface 19, and an optical drive interface 20, respectively.

Additionally, the computing system may further include an external memory 21 as the storage unit. The external memory 21 may be connected to the system bus 10 through an input/output interface 24.

The drives and their associated computer-readable media provide nonvolatile storage of computer-executable instructions, data structures, program modules, and other data for the computing system.

Although the example environment described herein employs the hard disk 15, the magnetic disk 16 and the optical disk 17, other types of computer readable media for storing data can be used, including magnetic cassettes, flash memory cards, digital versatile disks, Bernoulli cartridges, RAMs, ROMs, and the like.

Program code means including one or more program modules, such as an operating system 13b, one or more application programs 13c, other program modules 13d, and program data 13e, may be stored on the hard disk 15, the magnetic disk 16, the optical disk 17, the ROM 12a, or the RAM 12b.

A user may enter commands and information into the computing system through other input device 22 such as a keyboard, a pointing device, a microphone, a joy stick, a game pad, or the like. This other input device 22 can be connected to the processing unit 11 through the input/output interface 24 coupled to the system bus 10. The input/output interface 24 may logically represent any of a wide variety of different interfaces, such as, for example, a serial port interface, a PS/2 interface, a parallel port interface, a universal serial bus (USB) interface, or an institute of electrical and electronics engineers (IEEE) 1394 interface (i.e., a FireWire interface), or may even logically represent a combination of different interfaces.

Additionally, the computing system may further include a display device 26 such as a monitor or LCD and/or an audio device 27 such as a speaker or a microphone, which are connected to the system bus 10 via a video/audio interface 25. The video/audio interface 25 may include high definition multimedia interface (HDMI), graphics device interface (GDI), or the like.

The computing system is connectable to networks, such as, for example, an office-wide or enterprise-wide computer network, a home network, an intranet, and/or the Internet. The computing system can exchange data with external sources, such as, for example, remote computer systems, remote applications, and/or remote databases over such networks.

The computing system includes a network interface 28, through which the computing system receives data from external sources and/or transmits data to external sources. The network interface 28 facilitates the exchange of data with remote devices. For example, if the computing system is the terminal device 300, the terminal device 300 may transmit or receive information to or from the content server 400 through the network interface 28. If the computing system is the content server 400, the content server 400 may transmit or receive information to or from the set-top box 200 and the terminal device 300 through the network interface 28. The network interface 28 can logically represent one or more software and/or hardware modules, such as, for example, a network interface card and corresponding network driver interface specification (NDIS) stack.

Likewise, the computing system receives and/or transmits data from and/or to external sources through the input/output interface 24. The input/output interface 24 is coupled to a modem 23 (e.g., a standard modem, a cable modem, or a digital subscriber line (DSL) modem), through which the computing system receives data from and/or transmits data to external sources.

While FIG. 15 represents a suitable operating environment for the present invention, the principles of the present invention may be employed in any system that is capable of, with suitable modification if necessary, implementing the principles of the present invention.

The environment illustrated in FIG. 15 is illustrative only and by no means represents even a small portion of the wide variety of environments in which the principles of the present invention may be implemented.

Various kinds of information generated during the execution of a beacon-based payment service at the beacon service system of this invention may be stored and accessed from any of the computer-readable media associated with the computing system as shown in FIG. 15. For example, portions of such modules and portions of associated program data may be included in the operating system 13b, the application programs 13c, the program modules 13d and/or the program data 13e, for storage in the system memory 12.

When a mass storage device such as the hard disk is coupled to the computing system, such modules and associated program data may also be stored in the mass storage device. In a networked environment, program modules depicted relative to the computing system, or portions thereof, can be stored in a remote computer system connected through the modem 23 or network interface 25 of the input/output interface 24. Execution of such modules may be performed in a distributed environment as previously described.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Also, although the present specifications describe that operations are performed in a predetermined order with reference to a drawing, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

While this disclosure has been particularly shown and described with reference to an exemplary embodiment thereof, it will be understood by those skilled in the art that various changes in form and details may be made therein without departing from the scope of this disclosure as defined by the appended claims.

The present invention has a good possibility of sales on the market or business and also has industrial applicability suitable for practical and apparent implementation.

What is claimed is:

1. A radio fingerprint map construction and location tracking method implemented by a radio fingerprint device, the method comprising steps of:
   receiving, from a manager terminal device, radio environment information varying for a predetermined time at a specific referential position in a particular indoor area so as to create a radio fingerprint map wherein the radio environment information includes identification information and signal strength information;
   extracting a periodic pattern from the received radio environment information; and
   storing, in the radio fingerprint map, the extracted periodic pattern as a radio fingerprint feature of the specific referential position,
   wherein the periodic pattern is a change pattern or a change period of radio environment information with respect to time according to referential position,
   wherein the extracting step includes filtering the signal strength information having a greater difference by a given threshold or more in comparison with the other signal strength information, and extracting a number of times the identification information is received by each wireless communication device for the predetermined time, based on the periodic pattern.

2. The method of claim 1, further comprising step of:
   dividing the particular indoor area into cell units for constructing the radio fingerprint map,
   wherein the receiving step includes receiving the radio environment information at each referential position defined for each cell unit,
   wherein the extracting step includes extracting the periodic pattern with regard to each referential position defined for each cell unit, and
   wherein the storing step includes storing the periodic pattern extracted with regard to each referential position defined for each cell unit.

3. The method of claim 1, further comprising step of:
   receiving direction information of the manager terminal device for measuring the radio environment information,
   wherein the storing step further includes storing the direction information of the manager terminal device.

4. The method of claim 1, further comprising step of:
calculating, for each wireless communication device, a statistical value of the signal strength information received for the predetermined time,
wherein the storing step further includes storing, in the radio fingerprint map, the calculated statistical value as the radio fingerprint feature of the specific referential position.

5. The method of claim 4, wherein the statistical value include at least one of an average value, a mode value, a maximum value, a minimum value, and a median value.

6. The method of claim 1, wherein the receiving step further includes receiving frequency channel information for each wireless communication device, the frequency channel information being received from each wireless communication device by the manager terminal device, and
wherein the storing step further includes storing, in the radio fingerprint map, the received frequency channel information as the radio fingerprint feature of the specific referential position.

7. The method of claim 1, further comprising steps of:
receiving the radio environment information from a user terminal device; and
identifying a location of the user terminal device by comparing the received radio environment information with the periodic pattern stored in the radio fingerprint map.

8. The method of claim 7, wherein the identifying step includes, if a time cycle of receiving the radio environment information from the user terminal device is shorter than the periodic pattern stored in the radio fingerprint map, comparing the received radio environment information with a part of the stored periodic pattern.

9. The method of claim 7, wherein the identifying step includes, if a time cycle of receiving the radio environment information from the user terminal device is longer than the periodic pattern stored in the radio fingerprint map, comparing a part of the received radio environment information with the stored periodic pattern.

10. The method of claim 7, further comprising step of:
receiving direction information of the user terminal device,
wherein the identifying step further includes the location of the user terminal device by comparing the received direction information with direction information of the manager terminal device recorded in the radio fingerprint map.

11. A computer-readable non-transitory storage medium recording thereon a program for executing a radio fingerprint map construction and location tracking method, the method comprising steps of:
receiving, from a manager terminal device, radio environment information varying for a predetermined time at a specific referential position in a particular indoor area so as to create a radio fingerprint map, wherein the radio environment information includes identification information and signal strength information;
extracting a periodic pattern from the received radio environment information; and
storing, in the radio fingerprint map, the extracted periodic pattern as a radio fingerprint feature of the specific referential position,
wherein the periodic pattern is a change pattern or a change period of radio environment information with respect to time according to referential position,
wherein the extracting step includes filtering the signal strength information having a greater difference by a given threshold or more in comparison with the other signal strength information, and extracting a number of times the identification information is received by each wireless communication device for the predetermined time, based on the periodic pattern.

* * * * *